Patented May 12, 1942

2,282,820

UNITED STATES PATENT OFFICE 2,282,820

PEANUT AND SOYA BEAN OIL

Sidney Musher, New York, N. Y., assignor to Musher Foundation Incorporated, New York, N. Y., a corporation of New York No Drawing. Application January 28, 1942, Serial No. 428,500

5 Claims. (Cl. 260—412.2)

This invention relates to the preparation of highly stabilized novel peanut and soya bean oils and blends produced therefrom.

In the case of the hydrogenated shortenings and those particularly made from cottonseed oil, by the time those oils have been put through the usual refining treatment including causticizing, bleaching, hydrogenating and deodorizing, such shortenings are comparatively odorless and flavorless and frequently take on objectionable hydrogenated odors when used in the home for deep fat frying, or in the manufacture of pie crust or for similar baking purposes. This objectionable odor developing from the hydrogenated shortenings is particularly to be observed with hydrogenated cottonseed oil shortening and develops when the oil is subjected to an elevated temperature during the frying operation, such as when the shortening reaches a temperature of between 275° F. and 350° F.

In oils other than in hydrogenated shortenings, and particularly in the glyceride oils, rancidity and oxidation present a serious problem in their production and distribution.

An object of this invention is, therefore, the production of novel glyceride oils and blends containing the same whereby the oils are substantially stabilized against oxidative deterioration.

A further object of this invention is to reduce the development of the characteristic hydrogenated odor and taste in the shortening as well as in the fried or baked product with which the shortening is used.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, peanuts and soya beans are salt cured, preferably in unroasted condition, and following the salt curing process, they are expressed to remove a novel peanut or soya bean oil which is in highly stable condition and which may be added in small amounts to other oils, particularly glyceride oils, to stabilize the same against oxidative deterioration.

The peanuts are first desirably treated in order to remove the outer hull or shell. This may be done by subjecting the peanuts to a cracking process whereby the pod is cracked and then subjected to a current of air in order to blow away the hull.

The peanuts or soya beans are then treated with a salt brine to remove the earthy taste which has been found most objectionable. For example, the peanuts or soya beans may be immersed in a salt solution for as long as several days, although shorter periods may be employed where the earthy taste is not so pronounced.

The peanuts or soya beans may also be immersed in a less concentrated salt solution particularly where the curing is extended over a longer period.

After curing, the peanuts or soya beans may, where desired, be lightly washed to remove the adhering excess salt and they may then be subjected to a drying operation which is conducted preferably at a low temperature in order to prevent any roasting from taking place. The temperature of the drying should desirably not exceed about 220° F. at atmospheric pressure and the moisture content of the salt cured peanuts or soya beans should be reduced to less than 18% and desirably to less than 12%.

The peanuts or soya beans are then expressed to remove the peanut or soya oil which will be in highly stabilized condition. During the salting process, a portion of the salt will have penetrated into the flesh of the peanut or soya bean which penetration is desirable to produce the results of the present invention.

It is particularly surprising to find that salt aids in the production of a highly stable oil because salt is known to have pro-oxygenic properties whereas when the peanuts are salted in the aforesaid manner and then expressed, an antioxygenic effect is obtained.

The peanut or soya oil produced from the salt cured peanuts or soya beans may be added in a minor amount, desirably less than 25% and frequently in amounts as small as 5% to 10%, to other glyceride oils subject to oxidative deterioration to stabilize the same against such deterioration.

In order to obtain a proper curing action, the peanuts or soya beans may be held in a 50° to 80° salinometer salt brine and the salting may be continued over a period extending from several hours to about 2 weeks in order to obtain proper penetration of the salt into the tissues of the peanuts or soya beans so that upon expression, the novel peanut or soya oil will be produced.

The peanuts or soya beans may also be packed in dry salt although a wet brining treatment is most desirable.

The cured peanuts or soya beans have many unusual properties in that they produce an altogether different peanut or soya oil upon hydraulic expression or solvent extraction and particularly upon dry expression.

The peanut oil obtained from peanuts prepared under this invention not only is rendered much more stabilized against oxidative deterioration, but it has a novel and distinctive flavor which is differentiated from ordinary peanut oil and which may be used either in its unrefined or virgin state or may be subjected to the usual refining processes.

The peanuts or soya beans may be cured either in their roasted or unroasted condition. Preferably, however, they are cured in their unroasted condition and thereupon expressed.

The soya oil produced from the salt cured soya beans is also less subject to reversion.

These novel oils may also be refined and deodorized and will still retain their higher degree of stability so that they can be used alone or in combination with other oils subject to oxidative deterioration.

For example, the oil expressed from salt cured peanuts or soya beans may, in its crude or substantially refined condition, be used in a minor amount for blending with refined corn oil, cottonseed oil, sesame oil or even with refined soya bean or peanut oil made in the usual manner from soya beans or peanuts which have not been processed in accordance with the procedures of the present invention.

The cured oils thus obtained may also very desirably be used for addition in a minor amount to hydrogenated cottonseed oil shortening as well as to other types of solid or plastic, waxy, fatty glyceride materials, and preferably those which have been in whole or in part hydrogenated, such as compound or hydrogenated shortening produced from cottonseed, corn, peanut, sesame, sunflower seed, and soya bean in order to reduce the characteristic objectionable "rubberiness" of the said hydrogenated or hardened fats and oils.

The oils expressed from the salt cured peanuts or soya beans may also be used for addition in a minor amount to refined white petrolatum or mineral oils.

Where the cured peanuts or soya beans are roasted, they may then be macerated or ground to produce peanut butter, or soya butter, the peanut or soya butter thus obtained having a superior flavor.

The salt cured peanuts or soya beans thus obtained have many desirable characteristics particularly from the standpoint of flavor and aroma and are also rendered much more free of infestation and weevil damage.

The present application is a continuation in part of application Serial No. 334,899, filed May 13, 1940, and through said application continues the subject matter of application Serial No. 282,081, filed June 30, 1939, now Patent 2,201,112. Through the latter application, the present application continues the subject matter of the applications which matured into Patents 2,198,204 and 2,198,220.

Having described my invention, what I claim is:

1. A process of producing novel stabilized glyceride oils which comprises curing a legume selected from the group consisting of peanuts and soya beans with common salt, and then expressing to remove an oil which is in highly stabilized condition.

2. A process of producing novel stabilized glyceride oils which comprises immersing a legume selected from the group consisting of peanuts and soya beans in a salt brine until the salt has penetrated into the tissues of the legume, and then expressing to remove an oil which is in highly stabilized condition.

3. A process of producing novel stabilized glyceride oils which comprises curing a legume selected from the group consisting of peanuts and soya beans with common salt, expressing to remove the oil which is in highly stabilized condition, and then refining said oil whereby the stabilized characteristics are retained.

4. A process of producing novel stabilized glyceride oils which comprises curing peanuts with common salt, expressing to remove the oil which is in highly stabilized condition, and then refining said oil whereby the stabilized characteristics are retained.

5. A process of producing novel stabilized glyceride oils which comprises curing soya beans with common salt, expressing to remove the oil which is in highly stabilized condition, and then refining said oil whereby the stabilized characteristics are retained.

SIDNEY MUSHER.